United States Patent [19]

Ishida et al.

[11] Patent Number: 5,262,076

[45] Date of Patent: Nov. 16, 1993

[54] SYNTHETIC LUBRICATING OILS

[75] Inventors: Noboru Ishida; Hiroshi Hasegawa; Umekichi Sasaki; Tatsuyuki Ishikawa, all of Yokohama, Japan

[73] Assignee: Nippon Oil Co., Ltd., Tokyo, Japan

[21] Appl. No.: 685,535

[22] Filed: Apr. 15, 1991

[30] Foreign Application Priority Data

| Apr. 20, 1990 | [JP] | Japan | 2-105773 |
| Apr. 20, 1990 | [JP] | Japan | 2-105774 |
| May 11, 1990 | [JP] | Japan | 2-120046 |
| May 11, 1990 | [JP] | Japan | 2-120047 |
| Jun. 28, 1990 | [JP] | Japan | 2-168298 |

[51] Int. Cl.$^5$ .................................................. C10M 105/36
[52] U.S. Cl. ................................ 252/52 A; 252/56 S; 252/68
[58] Field of Search .................... 252/52 A, 56 S, 68

[56] References Cited

U.S. PATENT DOCUMENTS

| 2,739,127 | 3/1956 | Morway et al. | 252/56 S |
| 2,758,975 | 8/1956 | Cottle et al. | 252/49.8 |
| 3,627,810 | 12/1971 | Chang | 252/56 S |
| 3,642,858 | 2/1972 | Frevel et al. | 252/56 S |
| 4,248,726 | 3/1981 | Uchinuma et al. | 252/68 |
| 4,948,525 | 8/1990 | Sasaki et al. | 252/52 A |

FOREIGN PATENT DOCUMENTS

| 0089709 | 9/1983 | European Pat. Off. |
| 0336171 | 10/1989 | European Pat. Off. |
| 0384724 | 8/1990 | European Pat. Off. |
| 1006565 | 4/1957 | Fed. Rep. of Germany |
| 2154524 | 5/1973 | France |
| 2321477 | 3/1977 | France |

OTHER PUBLICATIONS

Defense Publication U.S. Patent Office US624687, Jan. 21, 1969 (Abstract).

*Primary Examiner*—Jacqueline V. Howard
*Attorney, Agent, or Firm*—Bucknam and Archer

[57] ABSTRACT

A synthetic lubricating oil comprising as a base oil at least one kind of a carbonic acid ester selected from the group consisting of:

[I] a carbonic acid ester represented by the general formula (1)

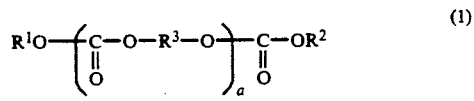

wherein $R^1$ and $R^2$ are each an alkyl or dihydric alcohol residue, $R^3$ is an alkylene, and a is 0–30,

[II] a carbonic acid ester represented by the general formula (2)

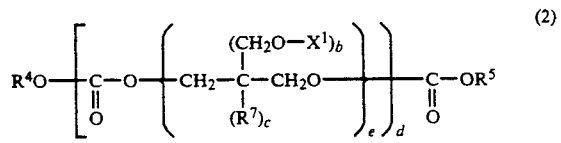

wherein $X^1$ is —H or

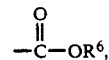

$R^4$–$R^6$ are each an alkyl, cycloalkyl or neopentyl type polyol residue, $R^7$ is an alkyl, b is 1 or 2, c is 0 or 1 (b+c=2), d is 0–30, and e is 1–3, and

[III] a carbonic acid ester of which alcohol moieties are (A) a monohydric alcohol, (B) a dihydric alcohol, and (C) a neopentyl type polyol or dimer or trimer thereof.

19 Claims, No Drawings

SYNTHETIC LUBRICATING OILS

BACKGROUND OF THE INVENTION

1. Field of the Invention

This invention relates to a synthetic lubricating oil and, more specifically, it relates to a synthetic lubricating oil which comprises a specific carbonic acid ester as a major component (a base oil) and is especially useful as a lubricating oil for refrigerators and the like (the oil being hereinafter referred to as "a refrigerator oil").

2. Prior Art

Generally, naphthenic mineral oils, paraffinic mineral oils, alkylbenzenes, polyglycolic oils and mixtures thereof, which have each a kinematic viscosity of 10–200 cSt at 40° C., as well as said oils incorporated with suitable additives, have been used as refrigerator oils.

On the other hand, chlorofluorocarbon type refrigerants (CFCS), such as CFC-11, CFC-12, CFC-115 and HCFC-22, have been used as such for refrigerators.

Of these CFCS, those such as CFC-11, CFC-12 and CFC-115, which are obtained by substituting all the hydrogen atoms of their hydrocarbons by halogen atoms including chlorine atoms, may lead to the destruction of the ozone layer, and, therefore, the use of the CFCS has been restricted. Accordingly, hydrogen-containing halogenocarbons, particularly chlorine-free type halogenocarbons such as HFC-134a and HFC-152a, have been being used as substitutes for CFCS. HFC-134a is especially hopeful as a substitute refrigerant since it is similar in thermodynamic properties to CFC-12 which has heretofore been used in many kinds of refrigerators for home cold-storage chests, air-conditioners, car air-conditioners and the like.

Refrigerator oils require various properties, among which their miscibility with refrigerants is extremely important in regard to lubricity and system efficiency in refrigerators. However, conventional refrigerator oils comprising, as the base oils, naphthenic oils, paraffinic oils, alkylbenzenes and the like, are hardly miscible with chlorine-free type halogenocarbons such as HFC-134a. Therefore, if said conventional refrigerator oils are used in combination with HFC-134a, the resulting mixture will separate into two layers at normal temperature thereby to degrade the oil-returnability which is the most important within the refrigeration system and cause various troubles such as a decrease in refrigeration efficiency, the deterioration of lubricity and the consequent seizure of the compressor within the system whereby the refrigerator oils are made unsuitable for use as such.

In attempts to solve such problems, the present inventors developed polyglycolic refrigerator oils which have excellent miscibility with HFC-134a as compared with conventional known refrigerator oils, filed an application for a patent for the thus developed polyglycolic refrigerator oils and have already obtained a patent (U.S. Pat. No. 4,948,525) therefor. Further, U.S. Pat. No. 4,755,316 discloses polyglycolic refrigerator oils which are compatible with HFC-134a.

On the other hand, refrigerator oils used in compressors of home refrigerators and the like are required to have a high electrical insulating property. Among the known refrigerator oils, alkylbenzenes and the mineral oils have the highest insulating property, but they are hardly miscible with chlorine-free type halogenocarbons such as HFC-134a as mentioned above. Further, the polyglycolic oils having excellent miscibility with HFC-134a raise problems as to their inferior electrical insulating property.

The present inventors found that esters having specific structures have excellent miscibility with chlorine-free type halogenocarbons such as HFC-134a and a high electrical insulating property, and filed applications for patents for the esters (Japanese Patent Applications Nos. Hei. 1-341244, Hei. 1-341245, Hei. 2-105772 and Hei. 2-121133. Hei. 1 and Hei. 2 are the same as 1989 and 1990 A.D., respectively.).

The known esters have various excellent properties as mentioned above, but they are hydrolyzable and therefore they are not necessarily suitable for use in apparatuses, such as cold-storage chests and car air-conditioners, which must be operated for a long period of time with high reliability. Accordingly, it has been desired to develop a refrigerator oil which has high miscibility with hydrogen-containing halogenocarbons such as HFC-134a, and also has a high electrical insulating property and high hydrolysis stability (or high stability to hydrolysis).

Further, conventional ester type synthetic oils have heretofore been known as synthetic oils having excellent heat resistance, but they are hydrolyzable as mentioned above, and therefore, it has been desired to develop an ester type synthetic oil having excellent hydrolytic stability.

SUMMARY OF THE INVENTION

The present inventors made various intensive studies in attempts to develop lubricating oils which can meet the aforesaid requirements and, as the result of their studies, they found that carbonic acid esters having specific structures have excellent miscibility with not only chlorine type halogenocarbons such as CFC-12, HCFC-22 and HCFC-142b, but also chlorine-free type halogenocarbons such as HFC-134a and HFC-152a, and a high electrical insulating property as well as excellent lubricity and excellent hydrolytic stability. This invention is based on this finding.

The object of this invention is to provide synthetic lubricating oils which comprise as a major component (or a base oil) at least one kind of carbonic acid ester having a specific structure, and have excellent miscibility with hydrogen-containing halogenocarbons such as HFC-134a, and a high electrical insulating property as well as excellent hydrolysis stability.

The synthetic lubricating oil of the present invention is characterized in that it comprises as a base oil at least one kind of a carbonic acid ester selected from the group consisting of:

[I] a carbonic acid ester represented by the general formula (1)

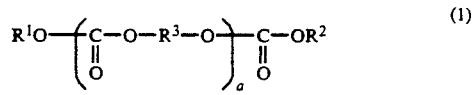

[II] a carbonic acid ester represented by the general formula (2)

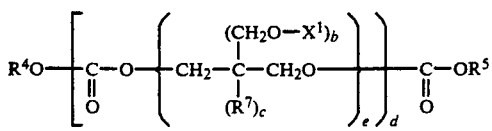

and

[III] a carbonic acid ester of which alcohol moieties are (A) a monohydric alcohol,
(B) a dihydric alcohol, and
(C) a neopentyl type polyol having 5–7 carbon atoms and 3–4 hydroxyl groups, or a dimer or trimer of the polyol.

First, the carbonic esters [I] will be explained in detail as indicated below.

In the formula (1), $R^1$ and $R^2$ may be identical with, or different from, each other and are each a group selected from the group consisting of a alkyl groups having 1–15 carbon atoms, preferably 2–9 carbon atoms, and dihydric alcohol residues having 2–12 carbon atoms, preferably 2–9 carbon atoms, $R^3$ is an alkylene group having 2–12 carbon atoms, preferably 2–9 carbon atoms, and a is an integer of 0–30, preferably 1–30.

The alkyl groups having 1–15 carbon atoms represented by each of $R^1$ and $R^2$ are exemplified by methyl group, ethyl group, n-propyl group, n-butyl group, n-pentyl group, n-hexyl group, n-heptyl group, n-octyl group, n-nonyl group, n-decyl group, n-undecyl group, n-dodecyl group, n-tridecyl group, n-tetradecyl group, n-pentadecyl group, iso-propyl group, iso-butyl group, tert.-butyl group, iso-pentyl group, iso-hexyl group, iso-heptyl group, iso-octyl group, iso-nonyl group, iso-decyl group, iso-undecyl group, iso-dodecyl group, iso-tridecyl group, iso-tetradecyl group and iso-pentadecyl group. Further, the dihydric alcohol residues having 2–12 carbon atoms are exemplified by the residues of ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol and 1,12-dodecanediol. The alkylene groups having 2–12 carbon atoms represented by $R^3$ are exemplified by straight-or branched-chain alkylene groups, such as ethylene group, trimethylene group, propylene group, tetramethylene group, butylene group, 2-methyltrimethylene group, pentamethylene group, 2,2-dimethyltrimethylene group, hexamethylene group, 2-ethyl-2-methyltrimethylene group, heptamethylene group, 2-methyl-2-propyltrimethylene group, 2,2-diethyltrimethylene group, octamethylene group, nonamethylene group, decamethylene group, undecamethylene group and dodecamethylene group.

The method for producing the carbonic acid ester [I] used in the present invention is not particularly limited. For example, a carbonic acid ester [I] can be produced by reacting in the presence of an alkali (such as metallic sodium, sodium hydroxide or sodium methoxide) and at a temperature of 80°–200° C. an alcohol having 1–15 carbon atoms such as methanol, ethanol, propanol, butanol, pentanol, hexanol, heptanol, octanol, nonanol, decanol, undecanol, dodecanol, tridecanol, tetradecanol or pentadecanol, with a carbonic acid diester or phosgene, and a dihydric alcohol such as ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, 1,12-dodecanediol or trimethylene glycol. Of course, these alcohols, carbonic acid diesters and dihydric alcohols may be used jointly as a mixture of at least two kinds thereof.

Secondly, the carbonic esters [II] will be hereunder explained in detail.

In the formula (2), $X^1$ is a hydrogen atom or a group represented by the general formula

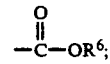

$R^4$, $R^5$ and $R^6$ may be identical with, or different from, one another and are each a group selected from the group consisting of alkyl groups having 1–12 carbon atoms, preferably 3–7 carbon atoms, cycloalkyl groups having 5–12 carbon atoms, preferably 5–8 carbon atoms, and neopentyl type polyol residues having 5–30 carbon atoms, preferably 5–21, and 3–8 hydroxyl groups; $R^7$ is an alkyl group having 1–6 carbon atoms, preferably 1–4 carbon atoms; b is an integer of 1 or 2, and c is an integer of 0 or 1 with the proviso that the sum (b+c)=2; d is an integer of 0–30, preferably 1–30, (when d is an integer of 0, at least one of $R^4$ and $R^5$ is the residue of a neopentyl type polyol); and e is an integer of 1–3.

The alkyl groups having 1–12 carbon atoms represented by $R^4$–$R^6$ are exemplified by methyl group, ethyl group, n-propyl group, iso-propyl group, n-butyl group, iso-butyl group, sec.-butyl group, tert.-butyl group, n-pentyl group, iso-pentyl group, neo-pentyl group, n-hexyl group, iso-hexyl group, n-heptyl group, iso-heptyl group, n-octyl group, iso-octyl group, n-nonyl group, iso-nonyl group, n-decyl group, iso-decyl group, n-undecyl group, iso-undecyl group, n-dodecyl group and iso-dodecyl group. Further, the cycloalkyl groups having 5–12 carbon atoms may further include alkylcycloalkyl groups and are exemplified by cyclopentyl group, cyclohexyl group, cycloheptyl group, cyclooctyl group, cyclononyl group, cyclodecyl group, cycloundecyl group, cyclododecyl group, methylcyclohexyl group, ethylcyclohexyl group, propylcyclohexyl group, butylcyclohexyl group and pentylcyclohexyl group. The neopentyl type polyol residues having 5–30 carbon atoms and 3–8 hydroxyl groups are exemplified by the residues of trimethylolethane, trimethylolpropane, trimethylolbutane, pentaerythritol and a dimer or trimer thereof. The alkyl groups having 1–6 carbon atoms represented by $R^7$ are exemplified by methyl group, ethyl group, propyl group, n-propyl group, iso-propyl group, n-butyl group, iso-butyl group, sec.-butyl group, tert.-butyl group, n-pentyl group, iso-pentyl group, neo-pentyl group, n-hexyl group and iso-hexyl group.

The method for producing the carbonic acid ester [II] used in the present invention is not particularly limited. For example, the carbonic acid ester [II] can be produced by reacting a chloroformate having 1–12 carbon atoms with pentaerythritol, trimethylolethane, trimethylolpropane, trimethylolbutane, a dimer or trimer thereof, or a mixture thereof, in the presence of an alkali metal hydroxide such as sodium hydroxide or potassium hydroxide.

Thirdly, the carbonic acid ester [III] will be hereunder explained in detail.

The monohydric alcohols (A) preferably used herein are those having 1-15 carbon atoms and are exemplified by those having a straight- or branched-chain alkyl group, such as methanol ethanol, propanol, butanol, pentanol, hexanol, heptanol, octanol, nonanol, decanol, undecanol, dodecanol, tridecanol, tetradecanol or pentadecanol. More preferred are monohydric alcohols having 1-9 carbon atoms.

The dihydric alcohols (B) preferably used herein are those having 2-12 carbon atoms and are exemplified by ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol and 1,12-dodecanediol. More preferred are dihydric alcohols having 2-9 carbon atoms.

The neopentyl type polyols (C) having 5-7 carbon atoms and 3-4 hydroxyl groups, or dimers or trimers thereof are exemplified by trimethylolethane, trimethylolpropane, trimethylolbutane, pentaerythritol and a dimer or trimer thereof. Among these polyols (C), the most preferred are trimethylolpropane, di-(trimethylolpropane), tri-(trimethylolpropane), pentaerythritol, di-(pentaerythritol), tri-(pentaerythritol) and the like.

The carbonic acid esters [III] used as a base oil in a lubricating oil of the present invention are those each having a chemical structure which is originated from the above alcoholic components (A), (B) and (C). In other words, the carbonic acid esters [III] include not only those prepared by the synthesis of, as raw materials, carbonic acid and the components (A), (B) and (C), but also those which resulted in having the chemical structure mentioned above even if the raw materials used are not the same as the above.

The method for producing the carbonic acid ester [III] used in the present invention is not particularly limited. For example, the carbonic acid ester [III] can be produced by the reaction of a carbonic diester or phosgene, as a source of carbonic acid moieties, with a mixture of the alcoholic components (A), (B) and (C), in the presence of an alkali such as metallic sodium, sodium hydroxide or sodium methoxide and at a temperature of 80°-200° C. In this case, various carbonic acid esters [III] having different chemical structures, molecular weights and viscosities can be obtained by changing the molar ratio of the carbonic acid moieties used to the alcoholic components used therewith. It is desirable that these raw materials be reacted together in molecular ratios of 1-100 moles, preferably 1-20 moles of a source of carbonic acid moieties, 1-20 moles, preferably 1-10 moles, of the component (A) and 1-100 moles, preferably 1-20 moles, of the component (B) respectively to 1 mole of the component (C).

In a case where the component (C) used is trimethylolpropane, the chemical structures of the resulting carbonic acid esters [III] are exemplified by the general formula (10)

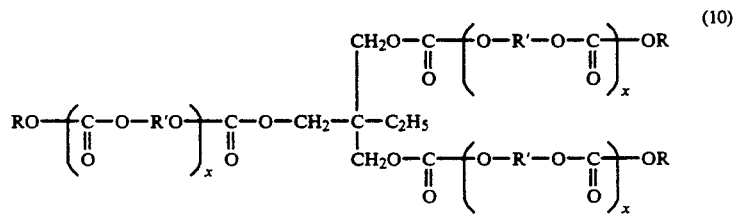

wherein R is an alkyl group having 1-15 carbon atoms, R' is an alkylene group having 2-12 carbon atoms and X is an integer of 0-12.

Further, the synthetic lubricating oils of the present invention will be hereunder explained in more detail.

The carbonic acid esters [I]-[III] obtained by the methods as mentioned above may be refined to remove the by-products and/or unreacted reactants, but the by-products and/or unreacted reactants may be present in small amounts in the lubricating oils of the present invention as far as they do not impair the excellent performances thereof.

In the preparation of the synthetic lubricating oils of the present invention, the carbonic acid esters [I]-[III] mentioned above may be used singly, or jointly as a mixture of at least two kinds of the esters.

The molecular weight of each of the carbonic acid esters [I]-[III] according to the present invention is not particularly limited, but, in a case where the carbonic acid ester is used as a refrigerator oil, the number average molecular weight of the carbonic acid ester is in the range of preferably 200-3000, more preferably 300-2000, to improve the compressor in sealability.

The kinematic viscosities of the carbonic acid esters [I]-[III] according to the present invention are in the range of preferably 2-150 cSt, more preferably 4-100 cSt at 100° C.

The lubricating oil of the present invention may comprise as the only base oil at least one member selected from the above carbonic acid esters [I]-[III] and, as required, it may additionally comprise other base oils for lubricating oils. The other base oils will be illustrated hereinafter. For example, mineral oils usable as the other base oils are exemplified by paraffinic or naphthenic base oils which are produced by subjecting lubricating oil fractions obtained by atmospheric distillation or reduced pressure distillation of a crude oil, to a suitable combination of refining treatments such as solvent deasphalting, solvent extraction, hydrocracking, solvent dewaxing, catalytic dewaxing, hydrorefining, sulfuric acid treatment and clay treatment. Further, the synthetic oils usable as the other base oils are exemplified by poly alpha-olefins such as polybutene, 1-octene oligomers and 1-decene oligomers; alkylbenzenes; alkylnaphthalenes; diesters such as ditridecyl glutarate, di 2-ethylhexyl adipate, diisodecyl adipate, ditridecyl adipate and di 3-ethylhexyl sebacate; polyol esters such as trimethylolpropane caprylate, trimethylolpropane pelargonate, pentaerythritol 2-ethyl hexanoate and pentaerythritol pelargonate; polyalkylene glycols; poly-phenyl ethers; silicone oils; perfluoro alkylethers; and mixtures of at least two kinds of the synthetic oils. In a case where the other base oils are to be incorporated in the carbonic acid esters [I]-[III], it is desirable that the carbonic acid esters [I]-[III] be present therein in a ratio of not less than 50% by weight, preferably not less than 70% by weight of the total amount of the other base oils and the carbonic acid esters.

In a case where the lubricating oil of the present invention is to be used as a refrigerator oil, the lubricating oil may comprise as the only base oil at least one member selected from the above carbonic acid esters [I]-[III] and, as required, it may additionally comprise other base oils for refrigerator oils. Among the other base oils, preferable ones are illustrated as follows:

(a) a polyoxyalkylene glycol or an ether thereof represented by the general formula (3)

  (3)

wherein $R^8$ and $R^9$ are each a hydrogen atom or an alkyl group having 1-18 carbon atoms, $R^{10}$ is an alkylene group having 2-4 carbon atoms, and f is an integer of 5-70, (b) a polyoxyalkylene glycol glycerol ether represented by the general formula (4)

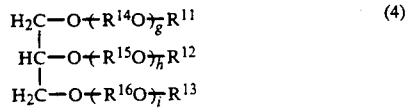  (4)

wherein $R^{11}$-$R^{13}$ are each a hydrogen atom or an alkyl group having 1-18 carbon atoms, $R^{14}$-$R^{16}$ are each an alkylene group having 2-4 carbon atoms, and g-i are each an integer of 5-7, (c) an ester represented by the general formula (5)

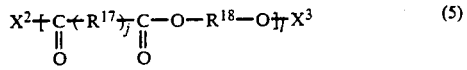  (5)

wherein $X^2$ is a group represented by the general formula $-OR^{19}$ or

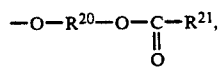

$X^3$ is a group represented by the general formula

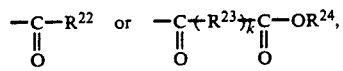

$R^{17}$ and $R^{23}$ are each an alkylene group having 1-8 carbon atoms, $R^{18}$ and $R^{20}$ are each an alkylene group having 2-16 carbon atoms, $R^{19}$ and $R^{24}$ are each an alkyl group having 1-15 carbon atoms, $R^{21}$ and $R^{22}$ are each an alkyl group having 1-14 carbon atoms, j and k are each an integer of 0 or 1 and l is an integer of 0-30, (d) a polyol ester represented by the general formula (6)

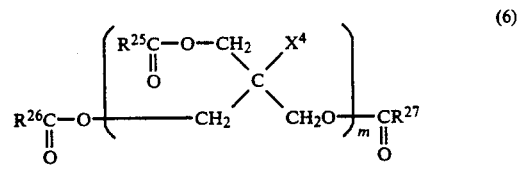  (6)

wherein $X^4$ is a group selected from the group consisting of methyl group, ethyl group, propyl group and groups represented by the general formula

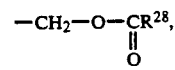

$R^{25}$-$R^{28}$ may be identical with, or different from, each other and are each a group selected from the group consisting of straight-chain alkyl groups having 3-11 carbon atoms, branched-chain alkyl groups having 3-15 carbon atoms and cycloalkyl groups having 6-12 carbon atoms, the straight-chain alkyl groups being present in a ratio of not more than 60% of the total alkyl groups, and m is an integer of 1-3, and (e) a polyol dicarboxylic acid ester represented by the general formula (7)

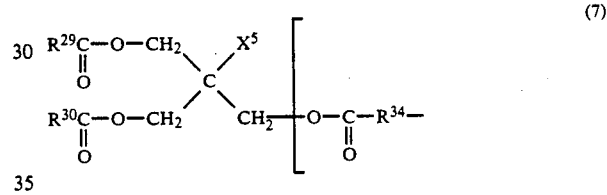  (7)

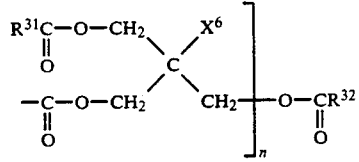

wherein $X^5$ and $X^6$ may be identical with, or different from, each other and are each a group selected from the group consisting of methyl group, ethyl group, propyl group and groups represented by the general formula

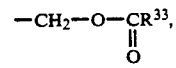

$R^{29}$-$R^{33}$ may be identical with, or different from each other and are each an alkyl group having 3-15 carbon atoms, $R^{34}$ is a divalent hydrocarbon group having 1-8 carbon atoms, and n is an integer of 1-5.

These other base oils represented by the formulae (3)-(7) may be used singly or jointly for adding to the lubricating oil of this invention. Further, the lubricating oil of this invention may be incorporated with paraffinic mineral oils, naphthenic mineral oils, polyα-olefins, alkylbenzenes and the like, but, in this case, the resulting mixed oil will be lowered in miscibility with chlorine-free type halogenocarbons.

The amount of these other base oils incorporated is not particularly limited as far as the excellent performances of the lubricating oil of this invention as a refrigerator oil are not impaired, but the other base oils should be present in the resulting mixed oil in a ratio of usually less than 50% by weight, preferably not more than 30% by weight of the total amount of the mixed oil.

To further enhance the lubricating oil of the present invention in excellent performances, the lubricating oil may be incorporated, as required, with heretofore known additives for lubricating oils. The additives are exemplified by antioxidants such as phenol-type ones, amine-type ones, sulfur-type ones, zinc thiophosphate-type ones and phenothiazine-type ones; wear resistant additives such as molybdenum dithiophosphate, molybdenum dithiocarbamate, molybdenum disulfide, carbon fluorides, boric esters, aliphatic amines, higher alcohols, higher fatty acids, fatty acid esters and fatty acid amides; extreme pressure agents such as tricresyl phosphate, triphenyl phosphate and zinc dithiophosphate; corrosion inhibitors such as petroleum sulfonates, alkylbenzene sulfonates and dinonylnaphthalene sulfonates; metal inactivators such as benzotriazole; metallic detergents such as alkaline earth metal sulfonates, alkaline earth metal phenates, alkaline earth metal salicylates and alkaline earth metal phosphonate; ash-free dispersants such as succinimide, succinate esters and benzylamine; antifoaming agents such as silicone; viscosity index improvers such as polymethacrylate, polyisobutylene and polystyrene; and pour point depressants. These additives may be used singly or jointly. The contents of the viscosity index improver, the antifoaming agent, the metal inactivator and each of the other additives are ordinarily 1–30% by weight, 0.0005–1% by weight, 0.005–1% by weight and 0.1–15% by weight of the total amount of the lubricating oil, respectively.

In a case where the lubricating oil of the present invention is to be used as a refrigerator oil, the lubricating oil may be incorporated further with at least one kind of a phosphorous compound selected from the group consisting of phosphoric esters, acid phosphoric esters, amine salts of acid phosphoric esters, chlorinated phosphoric esters and phosphorous esters, to improve the oil in wear resistance and load resistance. These phosphorous compounds are esters of phosphoric acid or phosphorous acid and an alkanol or a polyether type alcohol, or derivatives of the esters. The phosphoric esters are exemplified by tributyl phosphate, triphenyl phosphate and tricresyl phosphate. The acid phosphoric esters are exemplified by dietetradecyl acid phosphate, dipentadecyl acid phosphate, dihexadecyl acid phosphate, diheptadecyl acid phosphate and dioctadecyl acid phosphate. The amine salts of acid phosphoric esters are exemplified by salts of the above acid phosphoric esters and amines such as methylamine, ethylamine, propylamine, butylamine, pentylamine, hexylamine, heptylamine, octylamine, dimethylamine, diethylamine, dipropylamine, dibutylamine, dipentylamine, dihexylamine, diheptylamine, dioctylamine, trimethylamine, triethylamine, tripropylamine, tributylamine, tripentylamine, trihexylamine, triheptylamine and trioctylamine. The chlorinated phosphoric esters are exemplified by tris-dichloropropyl phosphate, tris chloroethyl phosphate, polyoxyalkylene bis[di(-chloroalkyl)] phosphate and tris chlorophenyl phosphate. The phosphorous esters are exemplified by dibutyl phosphite, tributyl phosphite, dipentyl phosphite, tripentyl phosphite, dihexyl phosphite, trihexyl phosphite, diheptyl phosphite, triheptyl phosphite, dioctyl phosphite, trioctyl phosphite, dinonyl phosphite, didecyl phosphite, diundecyl phosphite, triundecyl phosphite, didodecyl phosphite, tridodecyl phosphite, diphenyl phosphite, triphenyl phosphite, dicresyl phosphite, tricresyl phosphite and mixtures thereof. These phosphorous compounds may be added to the lubricating oil in a ratio of 0.1–5.0% by weight, preferably 0.2–2.0% by weight, of the total amount of the lubricating oil.

In the case in which the lubricating oil of the present invention is to be used as a refrigerator oil, to further improve the lubricating oil in stability, it may be incorporated with at least one kind of an epoxy compound selected from the group consisting of phenylglycidyl ether type epoxy compounds, glycidyl ester type epoxy compounds, epoxidized fatty acid monoesters and epoxidized vegetable oils. The said phenylglycidyl ether type epoxy compounds used herein include phenylglycidyl ether and alkylphenylglycidyl ethers. The said alkylphenylglycidyl ethers are those having 1 to 3 alkyl groups having 1 to 13 carbon atoms, among which are preferred those having an alkyl group having 4 to 10 carbon atoms, such as butylphenylglycidyl ether, pentylphenylglycidyl ether, hexylphenylglycidyl ether, heptylphenylglycidyl ether, octylphenylglycidyl ether, nonylphenylglycidyl ether and decylphenylglycidyl ether. The said glycidyl ester type epoxy compounds include phenylglycidyl esters, alkylglycidyl esters and alkenylglycidyl esters, with glycidyl benzoate, glycidyl acrylate, glycidyl methacrylate and the like being preferred.

The epoxidized fatty acid monoesters include esters of an epoxidized fatty acid having 12 to 20 carbon atoms and an alcohol having 1 to 8 carbon atoms, phenol or an alkylphenol. In particular, butyl, hexyl, benzyl, cyclohexyl, methoxyethyl, octyl, phenyl or butylphenyl esters of epoxidized stearic acid may preferably be used.

The epoxidized vegetable oils include epoxidized compounds of vegetable oils such as soybean oil, linseed oil and cottonseed oil.

Among these epoxy compounds, the preferable ones include phenylglycidyl ether type epoxy compounds and epoxidized fatty acid monoesters with the former being more preferable. The most preferred are phenylglycidyl ether, butylphenylglycidyl ether and mixtures thereof.

In the case in which these epoxy compounds are to be incorporated in the lubricating oil of the present invention, it is desirable that they be incorporated therein in a ratio of 0.1–5.0% by weight, preferably 0.2–2.0% by weight, of the total amount of the lubricating oil.

Furthermore, in a case where the lubricating oil of the present invention is to be used as a refrigerator oil, to further improve the lubricating oil in wear resistance and load resistance, it may be incorporated with a carboxylic acid represented by the general formula (8)

$$R^{35}-CH(COOH)_2 \qquad (8)$$

and/or the general formula (9)

$$R^{36}-CH_2-COOH \qquad (9)$$

wherein $R^{35}$ and $R^{36}$ may be identical with, or different from, each other and are each an alkyl group having 8–18 carbon atoms. The above carboxylic acids are exemplified by octylmalonic acid, nonylmalonic acid, decylmalonic acid, undecylmalonic acid, dodecylmalonic acid, tridecylmalonic acid, tetradecylmalonic acid, pentadecylmalonic acid, hexadecylmalonic acid, heptadecylmalonic acid, octadecylmalonic acid, decanoic acid, undecanoic acid, lauric acid, tridecanoic acid, myristic acid, pentadecanoic acid, palmitic acid, heptadecanoic acid, stearic acid, nonadecanoic acid, eicosanoic acid and mixtures of at least two kinds of the above carboxylic acids. In a case where these carboxylic acids are to be incorporated in the lubricating oil of the present invention, it is desirable that they be incorporated therein in a ratio of 0.01-3% by weight, preferably 0.05-2% by weight, of the total amount of the lubricating oil.

Of course, at least two kinds of the aforementioned phosphorus compounds, epoxy compound and carboxylic acids may be used jointly.

In the case where the lubricating oil of the present invention is to be used as a refrigerator oil, to further enhance the lubricating oil in performances, the lubricating oil may be incorporated, as required, with heretofore known additives for a refrigerator oil, which include phenol-type antioxidants such as di-tert-butyl-p-cresol and bisphenol A; amine-type antioxidants such as phenyl-α-naphthylamine and N,N-di(2-naphthyl)-p-phenylenediamine; wear resistant additives such as zinc dithiophosphate; extreme pressure agents such as chlorinated paraffin and sulfur compounds; oiliness improvers such as fatty acids; antifoaming agents such as silicone-type ones; and metal inactivators such as benzotriazole. These additives may be used singly or jointly. The total amount of these additives added is ordinarily not more than 10% by weight, preferably not more than 5% by weight, of the total amount of the lubricating oil.

In the case in which conventional refrigerator oils and/or additives are to be incorporated in the carbonic acid esters [I]-[III] of the present invention, it is desirable that the carbonic acid esters [I]-[III] be incorporated in the resulting lubricating oil in a ratio of more than 50% by weight, preferably not less than 70% by weight, of the total amount of the lubricating oil.

In a case where the lubricating oil of the present invention comprising at least one kind of the carbonic acid esters [I]-[III] as a major component is to be used as a refrigerator oil, the lubricating oil should have such viscosity and pour point as those which are normally suitable for an ordinary refrigerator oil, but it should desirably have a pour point of not higher than −10° C., preferably −20° C. to −80° C., to prevent it from solidification at a low temperature. Further, it should desirably have a kinematic viscosity of not less than 2 cSt, preferably not less than 3 cSt at 100° C., to keep the sealability of the compressor of the refrigerator when used, while it should desirably have a kinematic viscosity of not more than 150 cSt, preferably not more than 100 cSt at 100° C., in view of its fluidity at a low temperature and the efficiency of heat exchange in the evaporator when used.

The refrigerants which may be used in refrigerators in which the lubricating oils of the present invention are suitably used as refrigerator oils, include hydrogen-containing halogenocarbons such as 1,1,2,2-tetrafluoroethane (HFC-134), 1,1,1,2-tetrafluoroethane (HFC-134a), 1,1-difluoroethane (HFC-152a), trifluoromethane (HFC-23), monochlorodifluoromethane (HCFC-22) or 1-chloro-1,1-difluoroethane (HCFC-142b); hydrogen-free halogenocarbons such as trichloromonofluoromethane(CFC-11), dichlorodifluoromethane (CFC-12), monochlorotrifluoromethane (CFC-13) and monochloropentafluoromethane (CFC-115); and mixtures of at least two of the halogenocarbons. Among these halogenocarbons, the hydrogen-containing halogenocarbons are preferable with HFC-134a being particularly preferable in view of the environmental problems.

The lubricating oils of the present invention are very excellent in miscibility with the hydrogen-containing halogenocarbons, particularly chlorine-free type halogenocarbons, as compared with the heretofore known lubricating oils. Further, the lubricating oils of the present invention are excellent ones which have not only high miscibility with the chlorine-free type halogenocarbons and high electrical insulating property but also high lubricity and low hygroscopicity.

The lubricating oils of the present invention may particularly preferably be used as refrigerator oils in air-conditioners, dehumidifiers, cold-storage chests, freezers, freeze and refrigeration warehouses, automatic vending machines, showcases, cooling units in chemical plants, and the like which have a reciprocating or rotary compressor. Further, the above lubricating oils may also preferably be used in refrigerators having a centrifugal compressor. Further, the lubricating oils of the present invention may preferably be used as not only the refrigerator oils, but also engine oils, gear oils, hydraulic oils, metal processing oils and the other industrial lubricating oils.

The present invention will be better understood by the following Examples and Comparative Examples, but the present invention is not limited to the embodiments described in the Examples.

EXAMPLES 1-9 AND COMPARATIVE EXAMPLES 1-5

Lubricating oils of the present invention and comparative lubricating oils of conventional types are illustrated as follows:

[Example 1] A synthetic lubricating oil comprising a carbonic acid ester having a branched structure represented by the formula (11):

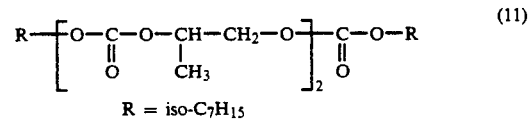

[Example 2] A synthetic lubricating oil comprising a carbonic acid ester having a branched structure represented by the formula (12):

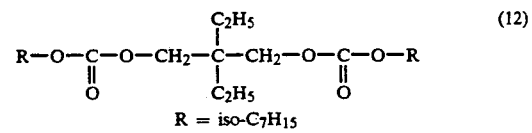

[Example 3] A synthetic lubricating oil comprising a carbonic acid ester having a branched structure represented by the formula (13):

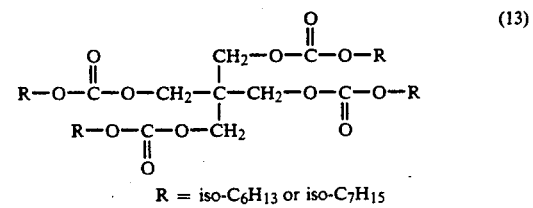

[Example 4] A synthetic lubricating oil comprising a carbonic acid ester having a branched structure represented by the formula (14):

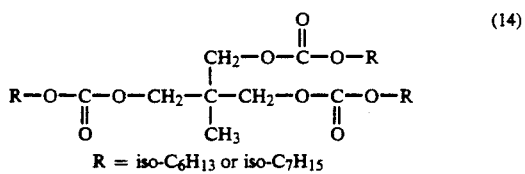

R = iso-$C_6H_{13}$ or iso-$C_7H_{15}$

[Example 5] A synthetic lubricating oil comprising a carbonic acid ester having a branched structure represented by the formula (15):

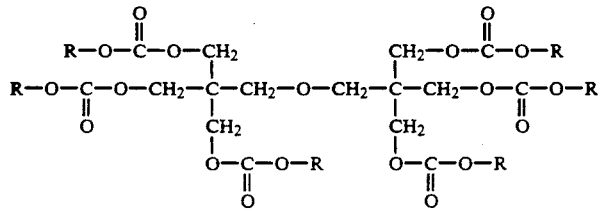

R = iso-$C_3H_7$ or iso-$C_4H_9$

[Example 6] Ten (10) moles of diethyl carbonate, 4 moles of 2-methyl-1-pentanol, 3 moles of neopentyl glycol and 1 mole of trimethylolpropane were introduced into a reactor and then subjected to transesterification in the presence of metallic sodium as a catalyst at 120° C. for 4 hours to obtain a reaction mixture. The thus obtained reaction mixture was distilled to remove ethanol formed by the transesterification therefrom, treated with diluted hydrochloric acid, washed with water and then distilled again to remove low molecular weight components in the reaction product therefrom to obtain a test oil which was a mixture of carbonic acid esters according to the present invention.

[Example 7] Ten (10) moles of diethyl carbonate, 4 moles of 2,2,4-trimethyl-1-pentanol, 3 moles of 3-methylpentanediol and 1 mole of trimethylolpropane were introduced into a reactor and then subjected to transesterification in the presence of metallic sodium as a catalyst at 120° C. for 4 hours to obtain a reaction mixture. The thus obtained reaction mixture was distilled to remove ethanol formed by the transesterification therefrom, treated with diluted hydrochloric acid, washed with water and then distilled again to remove low molecular weight components in the reaction product therefrom to obtain a test oil which was a mixture of carbonic acid esters according to the present invention.

[Example 8] Ten (10) moles of diethyl carbonate, 2 moles of 2-methyl-1-pentanol, 2 moles of 3-methylpentanediol, 2 moles of neopentyl glycol and 1 mole of pentaerythritol were introduced into a reactor and then subjected to transesterification in the presence of metallic sodium as a catalyst at 120° C. for 4 hours to obtain a reaction mixture. The thus obtained reaction mixture was distilled to remove ethanol formed by the transesterification therefrom, treated with diluted hydrochloric acid, washed with water and then distilled again to remove low molecular weight components in the reaction product therefrom to obtain a test oil which was a mixture of carbonic acid esters according to the present invention.

[Examples 9] Ten (10) moles of diethyl carbonate, 4 moles of 2,2,4-trimethyl-1-pentanol, 4 moles of propylene glycol and 1 mole of pentaerythritol were introduced into a reactor and then subjected to transesterification in the presence of metallic sodium as a catalyst at 120° C. for 4 hours to obtain a reaction mixture. The thus obtained reaction mixture was distilled to remove ethanol formed by the transesterification therefrom, treated with diluted hydrochloric acid, washed with water and then distilled again to remove low molecular weight components in the reaction product therefrom to obtain a test oil which was a mixture of carbonic acid esters

[Comparative Example 1] A naphthenic mineral oil

[Comparative Example 2] A branched-chain type alkylbenzene (average molecular weight: about 300)

[Comparative Example 3] A tetraester of pentaerythritol, 2-methyl-hexanoic acid and 2,4-dimethylheptanoic acid

[Comparative Example 4] A complex ester of 3-methyl-1,5-pentanediol, adipic acid and 3,5,5-trimethylhexanoic acid (average molecular weight: about 500)

[Comparative Example 5] Polyoxypropylene glycol (average molecular weight: about 900)

The base oils of Examples 1–9 for the lubricating oils of the present invention were evaluated for their performances that were their miscibility with HFC-134a, hydrolysis resistance, insulating property, wear resistance and hygroscopicity by the following respective test methods. For comparison, the mineral oil, the alkylbenzene, the ester oils and the polyoxyalkylene glycol of the Comparative Examples 1–5 which have heretofore been used as lubricating oils were evaluated in the same manner as in Examples 1–9.

Miscibility with HFC-134a 0.2 g of the test oil of each of the Examples and the Comparative Examples and 2.0 g of the refrigerant (HFC-134a) were sealed in a glass tube having an inner diameter of 6 mm and a length of 220 mm. The glass tubes so sealed were placed in a thermostat maintained at a predetermined low temperature and then in a thermostat kept at a predetermined high temperature to observe whether the refrigerant and the test oil were miscible with each other, separated from each other or made white-turbid.

Hydrolysis test

Sixty grams (60 g) of each of the test oils and 0.6 g of water were introduced in a 200-ml glass test tube and copper, iron and aluminum plates (6 cm$^2$) were then placed therein as deterioration accelerating catalysts, after which the whole in the tube was heated to 175° C. for 168 hours in an autoclave made of stainless steel thereby to thermally deteriorate the test oils.

After the test, each of the test oils was measured for acid value and hydroxyl value.

Insulating property

The test oils were each measured for specific volume resistivity at 25° C. in accordance with JIS C 2101.

FALEX wear test

The test oils were each applied to a test journal for measuring the amount of the test journal worn by having the journal run in at a test oil temperature of 100° C. under a load of 150 lb for 1 minute and then running it under a load of 250 lb for 2 hours in accordance with ASTM D 2670.

Hygroscopicity

Thirty grams (30 g) of each of the test oils were placed in a 300-ml beaker, allowed to stand for 7 days in an air-conditioned bath maintained at a temperature of 30° C. and a humidity of 60% and then measured for moisture content by the Karl-Fischer method.

TABLE 1

| Example-Comparative Example | Kinematic viscosity @ 100° C. (cSt) | Miscibility with HFC-134a Miscible temperature range (°C.) | Hydrolysis resistance (mg KOH/g) | | Resistivity @ 25° C. (Ω · cm) | Falex test Amount of journal worn (mg) | Hygroscopicity 30° C. 60% (%) |
|---|---|---|---|---|---|---|---|
| | | | Acid value | Hydroxyl value | | | |
| Example 1 | 4.9 | <−35-90 | 0.05 | 2.6 | $3.1 \times 10^{14}$ | 18 | 0.18 |
| Example 2 | 5.2 | <−30-82 | 0.04 | 2.2 | $2.5 \times 10^{14}$ | 15 | 0.12 |
| Example 3 | 5.1 | <−35-76 | 0.05 | 2.8 | $2.8 \times 10^{14}$ | 20 | 0.18 |
| Example 4 | 4.7 | <−30-68 | 0.05 | 2.5 | $2.9 \times 10^{14}$ | 17 | 0.12 |
| Example 5 | 11.2 | <−20-51 | 0.07 | 1.0 | $8.5 \times 10^{13}$ | 12 | 0.09 |
| Example 6 | 5.5 | <−70-80 | 0.02 | 2.5 | $3.0 \times 10^{14}$ | 21 | 0.19 |
| Example 7 | 8.2 | <−70-80 | 0.03 | 1.9 | $2.5 \times 10^{14}$ | 18 | 0.15 |
| Example 8 | 8.9 | <−70-80 | 0.05 | 1.1 | $2.2 \times 10^{14}$ | 18 | 0.10 |
| Example 9 | 12.5 | <−80-80 | 0.03 | 0.7 | $1.8 \times 10^{14}$ | 11 | 0.09 |
| Comparative Example 1 | 5.1 | Immiscible | 0.11 | 0.0 | $3.8 \times 10^{15}$ | 23 | 0.01 |
| Comparative Example 2 | 4.8 | Immiscible | 0.05 | 0.0 | $6.4 \times 10^{15}$ | 25 | 0.01 |
| Comparative Example 3 | 5.2 | <−45-95 | 9.5 | 11.3 | $1.1 \times 10^{14}$ | 14 | 0.19 |
| Comparative Example 4 | 6.8 | <−50-82 | 15.2 | 18.2 | $1.2 \times 10^{14}$ | 20 | 0.22 |
| Comparative Example 5 | 9.6 | <−60-64 | 0.15 | — | $2.6 \times 10^{10}$ | 38 | 2.90 |

It is apparent from the results indicated in Table 1 that the lubricating oils (Examples 1-9) of the present invention are very excellent in miscibility with a refrigerant, HFC-134a, as compared with those of Comparative Example 1-2.

Table 1 also shows that the ester oils of Comparative Examples 3 and 4 are excellent in miscibility with the refrigerant and insulating property, but they are inferior in hydrolysis resistance whereby they will raise a problem as to corrosion by acids formed when used in a refrigerator system in which external moisture is expected to enter into the system and mix with the ester oils, while the ester oils of Examples 1-9 will not raise any problem because of no formation of acids although they are somewhat hydrolyzable and form hydroxyl groups when used in such a refrigerator system as above.

As for insulating property, the lubricating oils of Examples 1-9 are by no means inferior to mineral oils and alkylbenzenes, are almost equal to ester oils and are excellent as compared with the alkylene glycol oil of Comparative Example 5.

The FALEX wear test shows that the lubricating oils of Examples 1-9 are at least equal in wear resistance to those of Comparative Examples 1-5.

As for hygroscopicity, the lubricating oils of Examples 1-9 are by no means inferior to the mineral oil of Comparative Example 1 and the alkylbenzene of Comparative Example 2, are almost equal to the ester oils of Comparative Examples 3-4 and are very excellent as compared with the alkylene glycol of Comparative Example 5.

Effect of the Invention

As is apparent from the above comparative experiments, the lubricating oils of the present invention are excellent in electrical insulating property as well as wear resistance, nonhygroscopicity and hydrolysis resistance, and are suitable for use in refrigerators using therein a hydrogen-containing halogenocarbon as a refrigerant. They can therefore be preferably used particularly as a refrigerator oil.

What is claimed is:

1. A synthetic lubricating oil comprising as a base oil a mixture of (i) at least one carbonic acid ester selected from the group consisting of:

[I] a carbonic acid ester represented by the general formula (1)

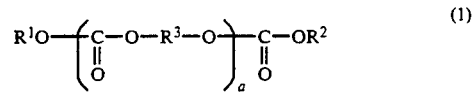

wherein $R^1$ and $R^2$ are identical with, or different from each other and are each a group selected from the group consisting of alkyl groups having 1-15 carbon atoms and dihydric alcohol residues having 2-12 carbon atoms, $R^3$ is an alkylene group having 2-12 carbon atoms, and a is an integer of 1-30;

[II] a carbonic acid ester represented by the general formula (2)

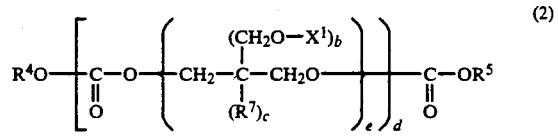

wherein $X^1$ is a hydrogen atom or a group represented by the general formula

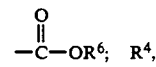

$R^5$ and $R^6$ are identical with, or different from, one another and are each a group selected from the group consisting of alkyl groups having 1-12 carbon atoms, cycloalkyl groups having 5-12 carbon atoms and neopentyl type polyol residues having 5-30 carbon atoms and 3-8 hydroxyl groups; $R^7$ is an alkyl group having 1-6 carbon atoms; b is an integer of 1 or 2, c is an integer of 0 or 1 with the proviso that the sum of b and c equals to 2; d is an integer of 0-30, at least one of $R^4$ and $R^5$ indicating a neopentyl type polyol residue when d is 0; and e is an integer of 1-3; and

[III] a carbonic acid ester other than said carbonic acid esters [I] and [II], which is prepared from a source of carbonic acid moieties and the following alcoholic components:

(A) a monohydric alcohol,
(B) a dihydric alcohol, and
(C) a neopentyl type polyol having 5-7 carbon atoms and 3-4 hydroxyl groups, or a dimer or trimer of the polyol, and (ii) at least one oil selected from the group consisting of (a) a polyoxyalkylene glycol or an ether thereof represented by the general formula (3)

   (3)

wherein $R^8$ and $R^9$ are each a hydrogen atom or an alkyl group having 1-18 carbon atoms, $R^{10}$ is an alkylene group having 2-4 carbon atoms, and f is an integer of 5-70.

(b) a polyoxyalkylene glycol glycerol ether represented by the general formula (4)

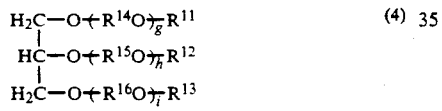   (4)

wherein $R^{11}$-$R^{13}$ are each a hydrogen atom or an alkyl group having 1-18 carbon atoms, $R^{14}$-$R^{16}$ are each an alkylene group having 2-4 carbon atoms, and g-i are each an integer of 5-7.

(c) an ester represented by the general formula (5)

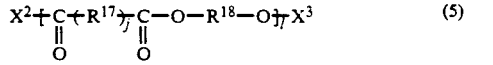   (5)

wherein $X^2$ is a group represented by the general formula —$OR^{19}$ or

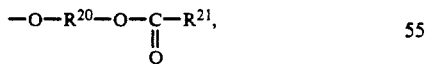

$X^3$ is a group represented by the general formula

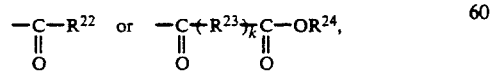

$R^{17}$ and $R^{23}$ are each an alkylene group having 1-8 carbon atoms, $R^{18}$ and $R^{20}$ are each an alkylene group having 2-16 carbon atoms, $R^{19}$ and $R^{24}$ are each an alkyl group having 1-15 carbon atoms, $R^{21}$ and $R^{22}$ are each an alkyl group having 1-14 carbon atoms, j and k are each an integer of 0 or 1 and p is an integer of 0-30.

(d) a polyol ester represented by the general formula

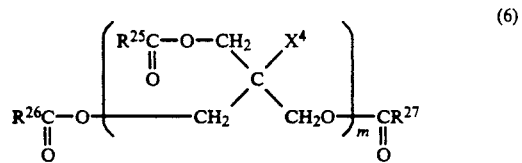   (6)

wherein $X^4$ is a group selected from the group consisting of methyl group, ethyl group, propyl group and groups represented by the general formula

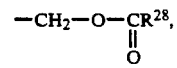

$R^{25}$-$R^{28}$ may be identical with, or different from, each other and are each a group selected from the group consisting of straight-chain alkyl groups having 3-11 carbon atoms, branched-chain alkyl groups having 3-15 carbon atoms and cycloalkyl groups having 6-12 carbon atoms, the straight-chain alkyl groups being present in a ratio of not more than 60% of the total alkyl groups, and m is an integer of 1-3, and (e) a polyol dicarboxylic acid ester represented by the general formula (7)

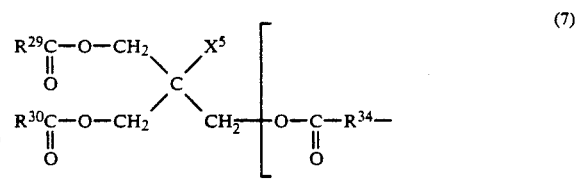   (7)

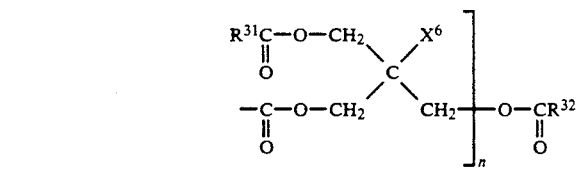

wherein $X^5$ and $X^6$ may be identical with, or different from, each other and are each a group selected from the group consisting of methyl group, ethyl group, propyl group and groups represented by the general formula

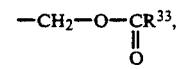

$R^{29}$-$R^{33}$ may be identical with, or different from each other and are each an alkyl group having 3-15 carbon atoms, $R^{34}$ is a divalent hydrocarbon group having 1-8 carbon atoms, and n is an integer of 1-5.

2. A synthetic lubricating oil according to claim 1, wherein the alcoholic component (C) of the carbonic acid ester [III] is at least one member selected from the group consisting of trimethylolpropane, di-(trimethylolpropane), tri-(trimethylolpropane), pentaerythritol, di-(pentaerythritol) and tri-(pentaerythritol).

3. A synthetic lubricating oil according to claim 1, wherein the synthetic lubricating oil is used as a lubricating oil for refrigerators.

4. A synthetic lubricating oil according to claim 2, wherein the synthetic lubricating oil is used as a lubricating oil for refrigerators.

5. A synthetic lubricating oil according to claim 3, wherein the halogenocarbon used as a refrigerant in the refrigerators is a hydrogen-containing one.

6. A synthetic lubricating oil according to claim 4, wherein the halogenocarbon used as a refrigerant in the refrigerators is a hydrogen-containing one.

7. A synthetic lubricating oil according to claim 1, wherein the base oil is a mixture of:

(e) a polyol dicarboxylic acid ester represented by the general formula (7)

$$\begin{array}{c} R^{29}C-O-CH_2 \\ \parallel \\ O \end{array} \begin{array}{c} X^5 \\ C \end{array} \begin{array}{c} \\ CH_2 \end{array} O-C-R^{34}- \\ \begin{array}{c} R^{30}C-O-CH_2 \\ \parallel \\ O \end{array} \qquad \begin{array}{c} \\ \parallel \\ O \end{array}$$

$$\left[ \begin{array}{c} R^{31}C-O-CH_2 \\ \parallel \\ O \end{array} \begin{array}{c} X^6 \\ C \end{array} \right. \\ \left. \begin{array}{c} -C-O-CH_2 \\ \parallel \\ O \end{array} \begin{array}{c} CH_2 \end{array} O-CR^{32} \\ \parallel \\ O \end{array} \right]_n \tag{7}$$

wherein $X^5$ and $X^6$ may be identical with, or different from, each other and are each a group selected from the group consisting of methyl group, ethyl group, propyl group and groups represented by the general formula $$-CH_2-O-CR^{33},$$
$$\parallel$$
$$O$$

$R^{29}-R^{33}$ may be identical with, or different from each other and are each an alkyl group having 3-15 carbon atoms, $R^{34}$ is a divalent hydrocarbon group having 1-8 carbon atoms, and n is an integer of 1-5.

8. A synthetic lubricating oil according to claim 1, wherein the at least one carbonic acid ester (i) is comprised in an amount of more than 50% by weight based on the total amount of the synthetic lubricating oil.

9. A synthetic lubricating oil according to claim 7, wherein the at least one carbonic acid ester (i) is comprised in an amount of more than 50% by weight based on the total amount of the synthetic lubricating oil.

10. A synthetic lubricating oil according to claim 1, further comprising at least one kind of a phosphorus compound selected from the group consisting of phosphoric esters, acid phosphoric esters, amine salts of acid phosphoric esters, chlorinated phosphoric esters and phosphorous esters, in an amount of 0.1–5.0% by weight based on the total amount of the synthetic lubricating oil.

11. A synthetic lubricating oil according to claim 7, further comprising at least one phosphorus compound selected from the group consisting of phosphoric esters, acid phosphoric esters, amine salts of acid phosphoric esters, chlorinated phosphoric esters and phosphorous esters, in an amount of 0.1–5.0% by weight based on the total amount of the synthetic lubricating oil.

12. A synthetic lubricating oil according to claim 1, further comprising at least one epoxy compound selected from the group consisting of phenylglycidyl ether type epoxy compounds, glycidyl ester type epoxy compounds, epoxidized fatty acid monoesters and epoxidized vegetable oils, in an amount of 0.1–5.0% by weight based on the total amount of the synthetic lubricating oil.

13. A synthetic lubricating oil according to claim 7, further comprising at least one epoxy compound selected from the group consisting of phenylglycidyl ether type epoxy compounds, glycidyl ester type epoxy compounds, epoxidized fatty acid monoesters and epoxidized vegetable oils, in an amount of 0.1–5.0% by weight based on the total amount of the synthetic lubricating oil.

14. A synthetic lubricating oil according to claim 1, further comprising a carboxylic acid represented by the general formula (8)

$$R^{35}-CH(COOH)_2 \tag{8}$$

and/or the general formula (9)

$$R^{36}-CH_2-COOH \tag{9}$$

wherein $R^{35}$ and $R^{36}$ may be identical with, or different from, each other and are each an alkyl group having 8–18 carbon atoms, in an amount of 0.01–3% by weight based on the total amount of the synthetic lubricating oil.

15. A synthetic lubricating oil according to claim 7, further comprising a carboxylic acid represented by the general formula (8)

$$R^{35}-CH(COOH)_2 \tag{8}$$

and/or the general formula (9)

$$R^{36}-CH_2-COOH \tag{9}$$

wherein $R^{35}$ and $R^{36}$ may be identical with, or different from, each other and are each an alkyl group having 8–18 carbon atoms, in an amount of 0.01–3% by weight based on the total amount of the synthetic lubricating oil.

16. The lubricating oil according to claim 1 wherein said carbonic acid ester has the formula $$R \left[ \begin{array}{c} O-C-O-CH-CH_2-O \\ \parallel \qquad \qquad | \\ O \qquad \qquad CH_3 \end{array} \right]_2 C-O-R \\ \parallel \\ O$$

wherein R is isoheptyl.

17. The lubricating oil according to claim 1 wherein said carbonic acid ester has the formula

21

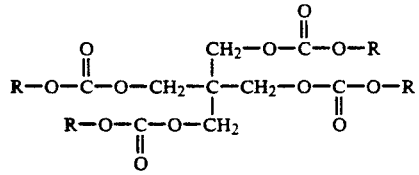

wherein R is isohexyl or isoheptyl.

18. The lubricating oil according to claim 1 wherein said carbonic acid ester has the formula

22

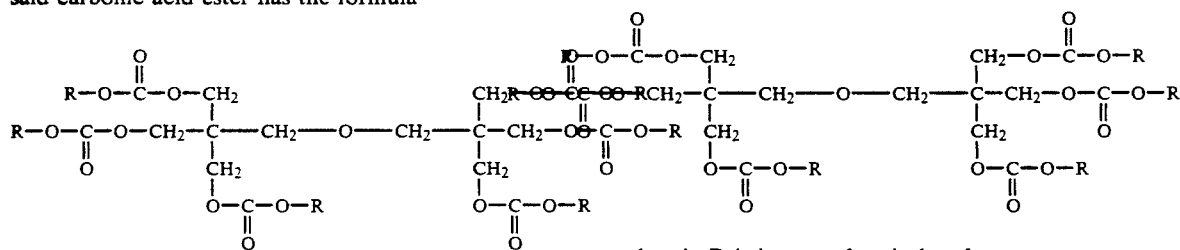

wherein R is isohexyl or isoheptyl.

18. The lubricating oil according to claim 1 wherein said carbonic acid ester has the formula wherein R is isopropyl or isobutyl.

wherein R is isopropyl or isobutyl.

19. The lubricating oil according to claim 1 wherein said base oil has a number average molecular weight of 200-3000, a kinematic viscosity of 2-150 cSt at 100° C.

* * * * *

19. The lubricating oil according to claim 1 wherein said base oil has a number average molecular weight of 200-3000, a kinematic viscosity of 2-150 cSt at 100° C.

* * * * *